Nov. 4, 1930.   A. G. WISE   1,780,510
COLLAPSIBLE HUB
Filed Aug. 25, 1928

Inventor
Anthony G. Wise
By Lyon & Lyon
Attorney

Patented Nov. 4, 1930

1,780,510

UNITED STATES PATENT OFFICE

ANTHONY G. WISE, OF LOS ANGELES, CALIFORNIA, ASSIGNOR TO METRO-GOLDWYN-MAYER CORPORATION, OF CULVER CITY, CALIFORNIA, A CORPORATION OF NEW YORK

COLLAPSIBLE HUB

Application filed August 25, 1928. Serial No. 302,085.

This invention relates broadly to collapsible hubs, hobs or pulleys for use on motion picture film equipment such as winders, rewinders, film magazines and the like, and for other purposes where a device of this nature may be adapted. For purpose of illustration only, the invention will be described in detail in its relation to use in the motion picture industry, particularly when used as a hub on a rewinding machine.

Whenever it is necessary to handle motion picture or other continuous film, such film is wound into rolls of varying length, say from a few feet to 400 or more. Mechanical winding devices are customarily used, but some difficulty has been experienced in devising means for attaching the free or "leader" end of a strip upon a winding hub so as to enable the rotation of the hub to wind the strip of film into a roll.

Furthermore, after a strip of film is wound into a roll, for example, upon a common form of rewinder (which resembles a spool with one edge removed) the roll or spool of strip film can be pulled off the hub only after causing considerable slippage to occur between adjoining or contacting layers of film, particularly centrally of the roll and near the hub. This slippage or movement of contacting film surfaces upon each other and in close contact therewith, causes scratches and abrasions to form on the delicate surfaces of the film, thereby often completely ruining a portion of the film.

Another object of this invention is to provide a hub or spool to be used in handling continuous film such as motion picture or sound film, the hub being provided with means for engaging the free or leader end of a film strip and with means adapted to assist in the removal of film wound upon said hub.

Other objects and uses of my invention will become apparent to those skilled in the art, from the following detailed description of one preferred form of my invention, it being understood that numerous changes and modifications may be made therein and adaptations made thereof without departing from the spirit of this invention.

In describing my invention reference shall be had to the appended drawings, in which.

Figure 1:
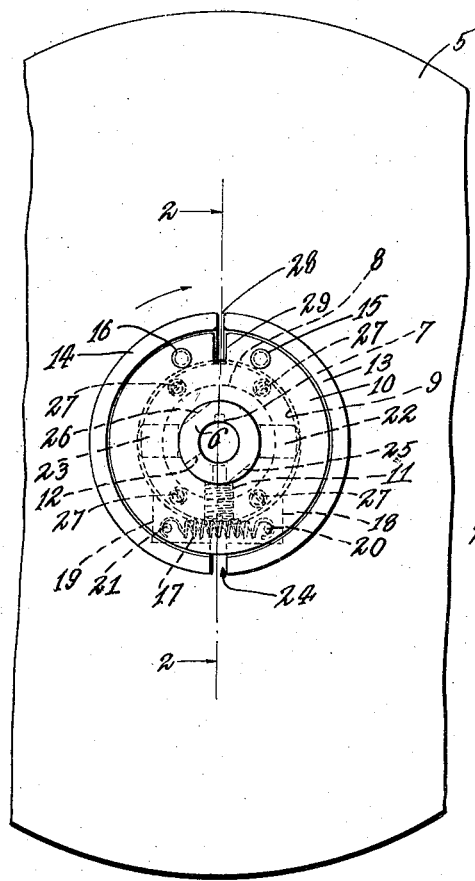
Figure 1 is a rear elevation, partly broken away, of a rewinder spool equipped with a collapsible hub.
Figure 2:
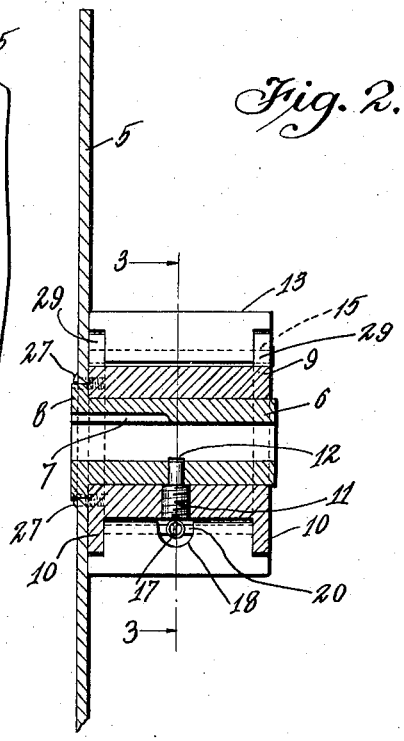
Figure 2 is a vertical axial section taken along line 2—2, Figure 1.
Figure 3:
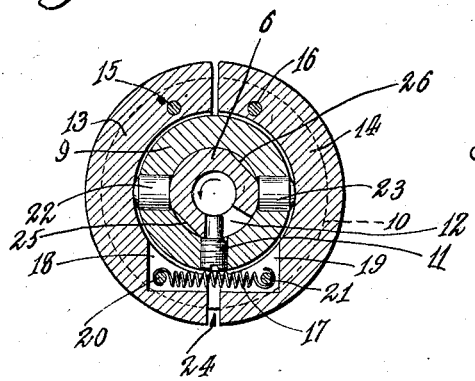
Figure 3 is a vertical section taken through the hub (in expanded position) along line 3—3 of Figure 2.
Figure 4:
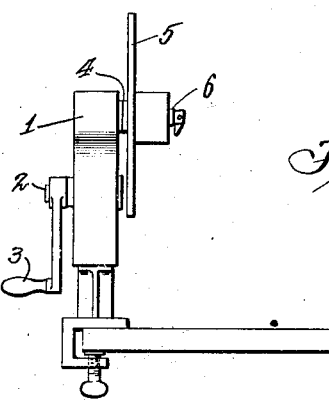
Figure 4 is a side elevation of a rewinder mechanism equipped with a rewinder and hub in position and ready for use.

In Figure 4, there is shown a common type of rewinder comprising a gear case 1 in which a large gear is mounted upon a shaft 2 such shaft being rotated by means of a handle 3. The large gear mounted on shaft 2 engages with a smaller gear mounted upon a spindle 4. The rewinder hub and guide disc 5 are keyed upon the shaft 4. The details of the hub and rewinder disc are shown in Figures 1, 2 and 3.

Referring to these figures, the guide disc 5 has attached thereto a collapsible hub which may comprise the following elements: a centrally disposed sleeve 6 provided with a keyway 7 adapted to receive the spindle 4 or other suitable shaft and to be keyed to said spindle or shaft by means of a key carried by said spindle or shaft.

The sleeve 6 may bear a butting collar 8 which may form an integral part of the sleeve or bushing 6. A spool 9 provided with circumferential flanges or edges 10 may be mounted upon the sleeve 6 and positioned thereon by means of a locking pin 11 mounted in the spool 9 and extending interiorly into an arcuate or segmental aperture 12 formed in the sleeve 6. By means of this construction the spool 9 may be rotated through a small angle, say 45°, upon the sleeve 6.

The hub proper may consist of a split or divided rim or hub, for example, it may comprise the two rim or hub sections 13 and 14 which are preferably hingedly connected to the flanges 10 of the spool 9 by means of pins 15 and 16. It is to be understood that adjoining ends of the rim or hub sections 13 and 14 are preferably hingedly connected to the spool 9 and means are provided for yieldingly connecting and maintaining the free ends of such hingedly connected rim portions in substantial contact. As shown in the drawing the rim portions 13 and 14 may be yieldingly connected together at the free ends by means of a spring 17 extending from a cavity 18 formed in rim portion 13 into a cavity 19 formed in the rim portion 14. The spring 17 is connected to the free ends of rim portions 13 and 14 by means of pins 20 and 21 mounted in the cavities 18 and 19, respectively.

The free ends of rim portions 13 and 14 are maintained in spaced relation by means of releasing pins 22 and 23 freely or slidably mounted in suitable apertures in the spool 9. The pins 22 and 23 are of such length that by resting against the sleeve 6 they come in contact with the inner surfaces of pivoted rim portions 13 and 14, forcing said rim portions outwardly so that the free ends of said rim portions are maintained in spaced relation, thereby forming the space or aperture 24.

The sleeve 6 is formed with milled or flattened surfaces in its outer surface and at such circumferential points in the sleeve 6 as will correspond with the circumferential distribution or position of the releasing pins 22 and 23; for example, if the releasing pins 22 and 23 are diametrically positioned in the spool 9 then the flats 25 and 26 are also diametrically positioned in the surface of the sleeve 6. It will be evident that by rotating the sleeve 6 shown in Figure 3 in a clockwise direction through an arc of about 45° permitted by the movement of the pin 11 in the arcuate aperture 12 formed in the sleeve 6, the release pins 22 and 23 will come in contact with the flats 25 and 26 respectively, thereby allowing spring 17 to bring the free ends of the pivoted rim or hub sections 13 and 14 in contact or in substantial contact, thereby causing the entire hub to collapse or the periphery of the hub or combined rim sections to be decreased.

In using the hereinabove described collapsible hub on a rewinder for continuous films the hub may be mounted centrally of a disc 5 by suitable means such as, for example, screws 27 connecting the disc 5 with the spool 9. The disc 5 together with its connected hub may then be mounted on a suitable spindle such as the spindle 4 of the device shown in Figure 4. A counter-clockwise rotation of the handle 3 of the device 4 will cause a clockwise rotation of the spindle 4, disc 5, and the collapsible hub. Rotation of a spindle keyed into the sleeve 6 in such counter-clockwise direction as indicated in Figure 1 will cause the collapsible hub to assume the position shown in such figure. Clockwise and counter-clockwise direction of rotation of spindle 4 in Figure 4 and sleeve 6 and hub in Figure 1 are reversed with relation to Figure 1 and Figure 4 inasmuch as Figure 1 is a view looking toward the operator, while Figure 4 shows a right hand view of the rewinder.

In order to cause collapse of the hub the spindle need only be turned slightly in a clockwise direction (Figure 1) whereupon the free ends of the pivoted rim sections will be brought into substantial contact, while the opening 28 between the pivoted ends of the rim sections will be slightly enlarged. The free or leader end of a strip of continuous film may then be inserted into the opening 28 and by again turning the spindle in a counter-clockwise direction as shown in Figure 1, the hub will expand, thereby locking or clamping the pivoted ends of the rim or hub sections 13 and 14 upon the strip of film inserted into opening 28.

Continued rotation of the spindle and sleeve 6 in a counter-clockwise direction will enable all of the film to be wound into a roll upon the hub. After the film has thus been wound a slight or partial rotation of the spindle sleeve in a clockwise direction or direction counter to that used during winding will cause the hub to collapse as hereinabove described, thereby liberating the leader end of the strip of film from opening 28 and allowing the completed roll of film to be easily removed from the hub.

In order to facilitate the introduction of a leader of film and attaching said leader to the hub, an axial slot 29 may be made in the edge 10 of the spool 9. The collapsible hub may be used independently of flange 5 when other means such as a weighted guide roller are provided to guide the film onto the hub.

It will be understood that this invention is not limited to a collapsible hub in which the direction of rotation is counter-clockwise when in expanded position or clockwise when in collapsed position. Furthermore, the invention is not limited to a hub which is only to be used in connection with a rewinder, but embraces broadly a hub or winder pulley which may be adapted for various other purposes, for example, it may be used in continuous film cameras, magazines, polishing machines, film waxing machines and the like, or it may even be used in other industries besides the motion picture industry.

Those skilled in the art will undoubtedly be able to make minor modifications and adaptations of this device, but all such modifications as come within the skill of the art are embraced as within the scope of the following claims.

I claim:

1. A collapsible hub comprising a central sleeve provided with flats in its outer surface, a spool on said sleeve, means for limiting the rotation of said spool on said sleeve, hub sections pivotally connected to said spool, spring means yieldingly connecting the free ends of said hub sections, and means carried by said spool and adapted to cooperate with said sleeve for pivotally moving said hub sections into expanded position when said sleeve is partially rotated with respect to said spool.

2. A collapsible hub comprising a central sleeve provided with flats in its outer surface, a spool on said sleeve, means for limiting rotation of said spool on said sleeve carried by said spool, hub sections pivotally connected to said spool, spring means yieldingly connecting the free ends of said hub sections, and radially movable pins carried by said spool and adapted to cooperate with said sleeve and flats thereof for moving said hub sections into expanded position.

3. A collapsible hub comprising a central sleeve provided with flats in its outer surface, a spool provided with flanged ends carried on said sleeve, means for limiting the rotation of said spool or said sleeve, hub sections pivotally connected to said spool flanges, a radial opening in said spool flange in alignment with the space between adjoining pivoted ends of said hub sections, spring means yieldingly connecting the free ends of said hub sections, and means carried by said spool and adapted to cooperate with said sleeve for pivotally moving said hub sections into expanded position.

4. A collapsible hub comprising a central sleeve provided with flats in its outer surface, a spool provided with flanged ends carried on said sleeve, means carried by said spool for limiting rotation of said spool on said sleeve, hub sections pivotally connected to said spool flanges, a radial opening in said spool flange in alignment with the space adjoining pivoted ends of said hub sections, spring means yieldingly connecting the free ends of said hub sections, and radially movable pins carried by said spool and adapted to cooperate with said sleeve and flats thereof for moving said hub sections into expanded position when said sleeve is partially rotated with respect to said spool.

5. A collapsible hub comprising a central sleeve provided with flats in its outer surface, a spool provided with flanged ends mounted on said sleeve, means for limiting rotation of said spool on said sleeve, a split hub carried by said spool and having adjoining ends thereof connected to said spool flanges, a radial opening in said spool flange in alignment with the space between adjoining pivoted ends of said hub sections, spring means yieldingly connecting the free ends of said hub sections, and means carried by said spool and adapted to cooperate with said sleeves for pivotally moving said hub sections into expanded position when said sleeve is partially rotated with respect to said spool.

Signed at Los Angeles, California, this 16 day of August, 1928.

ANTHONY G. WISE.